(12) United States Patent
Kim et al.

(10) Patent No.: US 7,650,278 B2
(45) Date of Patent: Jan. 19, 2010

(54) DIGITAL SIGNAL ENCODING METHOD AND APPARATUS USING PLURAL LOOKUP TABLES

(75) Inventors: Dohyung Kim, Hwaseong-si (KR); Junghoe Kim, Seoul (KR); Yangseock Seo, Yongin-si (KR); Shihwa Lee, Seoul (KR); Sangwook Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 590 days.

(21) Appl. No.: 11/080,409

(22) Filed: Mar. 16, 2005

(65) Prior Publication Data

US 2005/0254588 A1 Nov. 17, 2005

(30) Foreign Application Priority Data

May 12, 2004 (KR) ........................ 10-2004-0033381

(51) Int. Cl.
*G10L 19/00* (2006.01)

(52) U.S. Cl. .................... 704/200.1; 704/230; 704/500; 704/229; 341/106; 341/67

(58) Field of Classification Search ................. 704/230, 704/500, 200.1, 229; 341/106, 67
See application file for complete search history.

(56) References Cited

U.S. PATENT DOCUMENTS

| | | | |
|---|---|---|---|
| 5,732,391 A | | 3/1998 | Fiocca et al. |
| 5,864,802 A | * | 1/1999 | Kim et al. .................... 704/230 |
| 6,195,633 B1 | * | 2/2001 | Hu .............................. 704/229 |
| 6,240,379 B1 | * | 5/2001 | Yin ........................... 704/200.1 |

(Continued)

FOREIGN PATENT DOCUMENTS

KR 1999-21339 3/1999

(Continued)

OTHER PUBLICATIONS

Korean Unexamined Publication 10-1999-021339 (English Machine Translation); Aug. 1997.*

(Continued)

*Primary Examiner*—Sudhanshu C Pathak
(74) *Attorney, Agent, or Firm*—NSIP Law (57) ABSTRACT

A digital signal encoding method and apparatus using a plurality of lookup tables. The method includes: preparing a plurality of lookup tables storing numbers of allocated bits for encoding frequency bands of an input signal according to a characteristic of the input signal in a predetermined number of addresses; dividing an input signal in the time domain into signals in predetermined frequency bands; calculating address values of the frequency bands; selecting one of the plurality of lookup tables according to the characteristic of the input signal; extracting numbers of allocated bits of addresses having the calculated address values from the selected lookup table with respect to the frequency bands and allocating the numbers of bits to the frequency bands; and generating a bitstream by quantizing the input signal according to the numbers of allocated bits. Bit amount control suitable for a characteristic of an input signal can be performed by extracting numbers of allocated bits of frequency bands from an optimal lookup table selected according to the characteristic of the input signal. Also, an additional computational time can be reduced by using each occupancy rate per frequency band equal to each address of the lookup table as the characteristic of the input signal.

38 Claims, 9 Drawing Sheets

U.S. PATENT DOCUMENTS

| | | | |
|---|---|---|---|
| 6,792,402 B1* | 9/2004 | Chen | 704/200.1 |
| 6,882,976 B1* | 4/2005 | Hsu et al. | 704/500 |
| 7,050,966 B2* | 5/2006 | Schneider et al. | 704/200.1 |
| 7,292,163 B1* | 11/2007 | Fedele | 341/67 |
| 2005/0270195 A1* | 12/2005 | Kim et al. | 341/106 |

FOREIGN PATENT DOCUMENTS

| | | |
|---|---|---|
| KR | 10-300956 | 11/2001 |
| KR | 2003-36129 | 5/2003 |
| WO | WO 01/35673 | 5/2001 |

OTHER PUBLICATIONS

Korean Office Action dated Feb. 24, 2006 in co-pending Korean Application No. 2004-33381 and English translation.

EPO Search Report issued Jul. 26, 2005 on European Patent Application No. 05251759.

Hyen-O Oh et al., "Low Power MPEG/Audio Encoders Using Simplified Psychoacoustic Model and Fast Bit Allocation," presented at the International Conference on Consumer Electronics, Jun. 19-21, 2001, Los Angeles, CA; , pp. 320-321, published in the 2001 Digest of Technical Papers by the Institute of Electrical and Electronics Engineers, New York, NY: Jun. 19, 2001.

\* cited by examiner

| ADDRESS | 0 | 1 | 2 | 3 | 4 | | 127 |
|---|---|---|---|---|---|---|---|
| SR | 1.0000000 | 0.8404964 | 0.7071068 | 0.5946036 | 0.5000000 | | 0.0000000 |

FIG. 11

| ADDRESS \ NUMBER OF ALLOCATED BITS | 0 | 1 | ... | 7 | 8 | ... | 14 | 15 |
|---|---|---|---|---|---|---|---|---|
| ⋮ | | | | | | | | |
| 5 | 2 | 3 | ... | 1300 | 6543 | ... | 189 | 89 |
| ⋮ | | | | | | | | |
| 30 | 5 | 3 | ... | 5656 | 787 | ... | 547 | 54 |
| 31 | | | | | | | | |
| ⋮ | | | | | | | | |
| 61 | 7890 | 2356 | ... | 56 | 3 | ... | 0 | 0 |

DIGITAL SIGNAL ENCODING METHOD AND APPARATUS USING PLURAL LOOKUP TABLES

CROSS-REFERENCE TO RELATED APPLICATIONS

This application claims the priority of Korean Patent Application No. 2004-33381, filed on May 12, 2004 in the Korean Intellectual Property Office, the disclosure of which is incorporated herein in its entirety by reference.

BACKGROUND OF THE INVENTION

1. Field of the Invention

The present invention relates to a digital signal encoding method and apparatus, and more particularly, to a digital signal encoding method and apparatus using a plurality of lookup tables generated according to characteristics of input signals, select one lookup table among the plurality of lookup tables according to an input signal, and adaptively allocate the number of bits per frequency band from the selected lookup table.

2. Description of the Related Art

Digital transmission is much less sensitive to surrounding noise than analog transmission. As such, sound quality in the digital audio transmission is very good and the audio transmission can be reproduced very clearly. However, according to the increase of a data amount to be transmitted, various problems, such as an increase of a required memory capacity and a transmission line capacity, are caused.

To solve these problems, a data compression technology is needed. In the case of audio data, when original sound is compressed, transmitted, and reproduced, the reproduced sound should be almost or the same as the original sound. For this, a relatively small amount of information has to be transmitted.

A psychoacoustic model is typically used for audio signal encoding. By using a masking effect and a critical band of acoustic characteristics, even though an audio signal is encoded with a smaller number of bits than an original sound signal, sound quality having almost the same level as the original sound can be obtained by removing signals which people cannot hear, encoding only necessary signals, and allocating bits to the encoded signals.

Here, the masking effect indicates an effect that people cannot perceive a particular audio signal(s) even though they hear the audio signal because of a signal masking of another signal due to mutual interference among audio signals in a critical band. The critical band is a kind of unit used for people to discriminate sound frequencies and is typically divided into 24 bands. Since a bandwidth in a higher frequency is getting larger with a log scale, a person cannot easily discriminate a higher frequency signal from a lower frequency signal.

To allocate bits using the acoustic characteristics, a signal-to-noise ratio (SNR) and a signal-to-mask ratio (SMR) are obtained, and a mask-to-noise ratio (MNR) must be calculated from the SNR and the SMR. Here, a mask level indicates a minimum signal that people cannot perceive even though they hear. Therefore, bits do not have to be allocated for signals below the mask level.

After the MNR is obtained, bits are repeatedly allocated based on the MNR. However, a lot of computing time is needed for obtaining the MNR, and this means that real-time delay in an encoder is large. Accordingly, reducing the complexity of the necessary computations is important.

Figure 1:
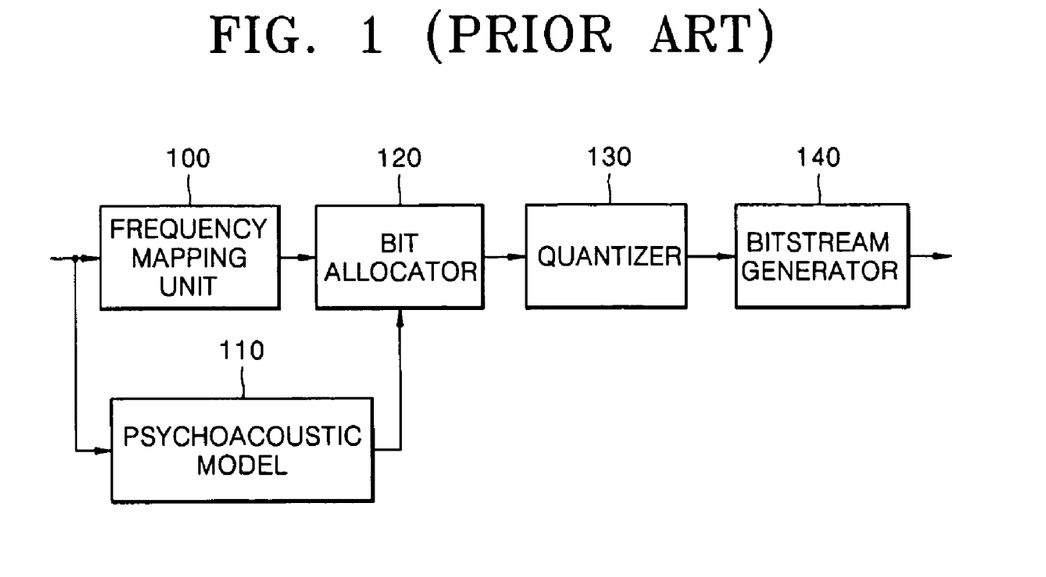
FIG. 1 is a block diagram of a conventional digital signal encoding apparatus using a psychoacoustic model.

FIG. 1 is a block diagram of a conventional digital signal encoding apparatus using a psychoacoustic model in the MPEG-1 standard. Referring to FIG. 1, the apparatus includes a frequency mapping unit 100, a psychoacoustic model 110, a bit allocator 120, a quantizer 130, and a bitstream generator 140.

The frequency mapping unit 100 converts an input signal in the time domain into signals in predetermined frequency bands using a band resolution filter. The psychoacoustic model 110 is a part in which the complexity of the required computations is largest in the apparatus and calculates and outputs an SMR, which is a standard for bit allocation per frequency band. The SMR value is calculated according to the following series of operations. First, an audio signal in the time domain is converted into a signal in a frequency domain using a fast Fourier transform (FFT). Second, the sound pressure level of each band is calculated as shown in Equation 1.

$$SPL=MAX\{power, 20\log(scf \times 32768)\}dB \qquad \text{Equation 1}$$

Third, an absolute masking threshold value is calculated. Fourth, tonal and non-tonal sound components of the audio signal are determined. Fifth, a masker is determined. Sixth, each masking threshold value is calculated. Seventh, an entire masking threshold value is calculated. Eighth, a minimum masking threshold value of each band is calculated. Finally, the SMR value of each band is calculated.

The bit allocator 120 obtains a bit allocation amount of each band by repeatedly performing the following series of operations based on the SMR values received from the psychoacoustic model 110. First, the number of bits initially allocated to each band is set to 0. Second, an MNR value of each band is obtained. Here, the MNR value is obtained by subtracting an SMR value from an SNR value. Third, the number of allocated bits of a band having a minimum MNR value among MNR values obtained for bands increases by 1. Finally, if the number of bits required for each band is not satisfied, the second and third operations are repeated for the unsatisfied bands.

The quantizer 130 quantizes the input signal according to the following series of operations. First, X is a value obtained by dividing a sample in each band by a scale factor. Second, A*X+B (here, A and B are values in a predetermined table) is calculated. Third, bits as many as the number of allocated bits obtained in a bit allocating process are obtained from the calculated values. Finally, a most significant bit (MSB) is inversed.

The bitstream generator 140 generates a bitstream using the quantized input signal.

As described above, the conventional digital signal encoding apparatus using a psychoacoustic model needs nine procedures to obtain the SMR values. Accordingly, the complexity of the necessary computations is large, which increases execution time. Also, since the MNR values are calculated using the SMR values and a bit allocating loop is repeatedly performed based on the MNR values, a time delay is also generated in this process.

Figure 2:
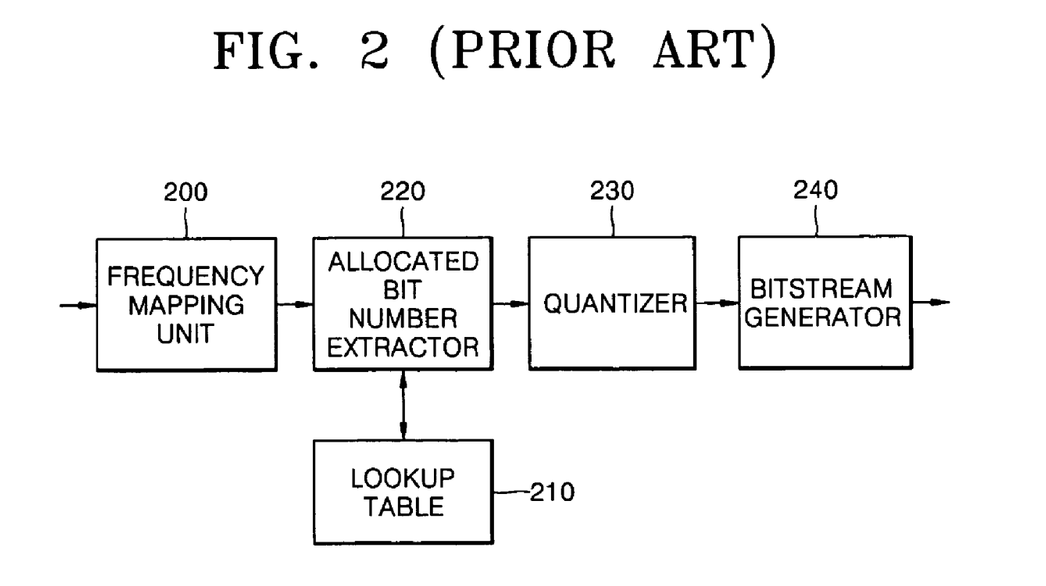
FIG. 2 is a block diagram of a conventional digital signal encoding apparatus using one lookup table.

FIG. 2 is a block diagram of a digital signal encoding apparatus using one lookup table. The apparatus uses a conventional digital signal encoding apparatus using a psychoacoustic model, as described in earlier work product, U.S. Pat. No. 5,864,802, also assigned to the same assignee of this application. Referring to FIG. 2, the apparatus includes a frequency mapping unit 200, a lookup table 210, an allocated bit number extractor 220, a quantizer 230, and a bitstream generator 240.

The frequency mapping unit 200 converts an input signal in the time domain into signals in predetermined frequency bands using a band resolution filter. The lookup table 210 stores numbers of allocated bits for encoding frequency bands in addresses corresponding to characteristics of the frequency bands.

The allocated bit number extractor 220 calculates an address value of each frequency band of the input signal and extracts the number of allocated bits of each address having the calculated address value from the lookup table 210. The quantizer 230 quantizes the input signal using the number of bits allocated to each frequency band. The bitstream generator 240 generates a bitstream using the quantized input signal.

As described above, by extracting the number of allocated bits of each frequency band stored in a lookup table and using the numbers of allocated bits for encoding, the conventional digital signal encoding apparatus using one lookup table can prevent the complex computations and time delay generated by using the psychoacoustic model. However, since input signals having different characteristics are encoded using the same lookup table, adaptive encoding according to characteristics of input signals is limited.

SUMMARY OF THE INVENTION

Aspects of the present invention provide a digital signal encoding method and apparatus using a plurality of lookup tables, which generate the plurality of lookup tables according to characteristics of input signals, select one lookup table among the plurality of lookup tables according to a characteristic of an input signal, and adaptively allocate the number of bits per frequency band from the selected lookup table in order to adaptively encode digital signals according to characteristics of input signals.

Additional aspects and/or advantages of the invention will be set forth in part in the description which follows and, in part, will be obvious from the description, or may be learned by practice of the invention.

According to an aspect of the present invention, there is provided a digital signal encoding method using a plurality of lookup tables, the method including: preparing a plurality of lookup tables storing numbers of allocated bits for encoding frequency bands of an input signal in a predetermined number of addresses according to a characteristic of the input signal; dividing an input signal in the time domain into signals in predetermined frequency bands; calculating address values of the frequency bands; selecting one of the plurality of lookup tables according to the characteristic of the input signal; extracting numbers of allocated bits of addresses having the calculated address values from the selected lookup table with respect to the frequency bands and allocating the numbers of bits to the frequency bands; and generating a bitstream by quantizing the input signal according to the numbers of allocated bits.

In an aspect of the present invention, the characteristic of the input signal is the number of frequency bands among the frequency bands of the input signal, whose occupancy rate is less than or more than a predetermined standard value. Also, the occupancy rate of each frequency band can be a larger value between an occupancy rate of a scale factor of each frequency band and an occupancy rate of a mean value of input signals in each frequency band or a larger value between an occupancy rate of a square of a scale factor of each frequency band and an occupancy rate of a mean power of input signals in each frequency band.

In an aspect of the present invention, each address of the lookup table is one of a dispersion of each frequency band, a scale factor of each frequency band, a square of a scale factor of each frequency band, a mean value of input signals in each frequency band, a mean power of input signals in each frequency band, a larger value between an occupancy rate of a scale factor of each frequency band and an occupancy rate of a mean value of input signals in each frequency band, or a larger value between an occupancy rate of a square of a scale factor of each frequency band and an occupancy rate of a mean power of input signals in each frequency band.

In an aspect of the present invention, the method further includes, after the allocating the numbers of bits, comparing the number of bits actually allocated to an entire input signal and the number of bits required for the entire input signal and adjusting the number of allocated bits according to the comparison result.

According to another aspect of the present invention, there is provided a method of generating a plurality of lookup tables, the method comprising: generating the plurality of lookup tables storing numbers of allocated bits for encoding frequency bands of an input signal according to a characteristic of the input signal in a predetermined number of addresses.

In an aspect of the present invention, the method also includes: preparing a predetermined number of input signals classified into input signals having the same characteristic; calculating the number of allocated bits per frequency band with respect to the input signals having the same characteristic using a psychoacoustic model and generating a lookup table by storing the calculated numbers of allocated bits in addresses of the frequency bands; and repeating the above two operations with respect to each characteristic of the input signals.

In an aspect of the present invention, the method includes: preparing a predetermined number of input signals; classifying the input signals into input signals having the same characteristic; calculating the number of allocated bits per frequency band with respect to the input signals having the same characteristic using a psychoacoustic model and generating a lookup table by storing the calculated numbers of allocated bits in addresses of the frequency bands; and repeating the classifying of the input signals and the generating of the lookup table with respect to each characteristic of the input signals.

In an aspect of the present invention, the method excludes addresses, in which the number of allocated bits is 0, from the lookup table, and if the numbers of allocated bits of consecutive addresses are all the same, the method can store only addresses in which the number of allocated bits is changed in the lookup table.

According to another aspect of the present invention, there is provided a digital signal encoding apparatus using a plurality of lookup tables, the apparatus including: a plurality of lookup tables storing numbers of allocated bits for encoding frequency bands of an input signal in a predetermined number of addresses according to a characteristic of the input signal; a frequency mapping unit dividing the input signal in the time domain into signals in predetermined frequency bands; a lookup table selector selecting one of the plurality of lookup tables according to the characteristic of the input signal; an allocated bit number extractor calculating address values of the bands of the input signals, extracting numbers of allocated bits corresponding to the calculated address values from the selected lookup table with respect to the frequency bands, and allocating the numbers of bits to the frequency bands; a quantizer quantizing the input signals using the numbers of bits allocated to the frequency bands; and a bitstream generator generating and outputting a bitstream using the quantized input signals.

In an aspect of the present invention, a characteristic of the input signal can be the number of frequency bands among the frequency bands of the input signal, whose occupancy rate is less than or more than a predetermined standard value. Also, the occupancy rate of each frequency band can be a larger value between an occupancy rate of a scale factor of each frequency band and an occupancy rate of a mean value of input signals in each frequency band or a larger value between an occupancy rate of a square of a scale factor of each frequency band and an occupancy rate of a mean power of input signals in each frequency band.

In an aspect of the present invention, an address of the lookup table can be a dispersion of each frequency band, a scale factor of each frequency band, a square of a scale factor of each frequency band, a mean value of input signals in each frequency band, a mean power of input signals in each frequency band, a larger value between an occupancy rate of a scale factor of each frequency band and an occupancy rate of a mean value of input signals in each frequency band, or a larger value between an occupancy rate of a square of a scale factor of each frequency band and an occupancy rate of a mean power of input signals in each frequency band.

In an aspect of the present invention, the apparatus further includes a bit number adjuster comparing the number of bits allocated to an entire input signal by the allocated bit number extractor and the number of bits required for the entire input signal and adjusting the number of bits allocated to each frequency band according to the comparison result.

Aspects of the present invention also provide a computer readable medium having recorded thereon a computer readable program for performing a digital signal encoding method using a plurality of lookup tables.

Aspects of the present invention also provide a computer readable medium having recorded thereon a computer readable program for performing a method of generating a plurality of lookup tables.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
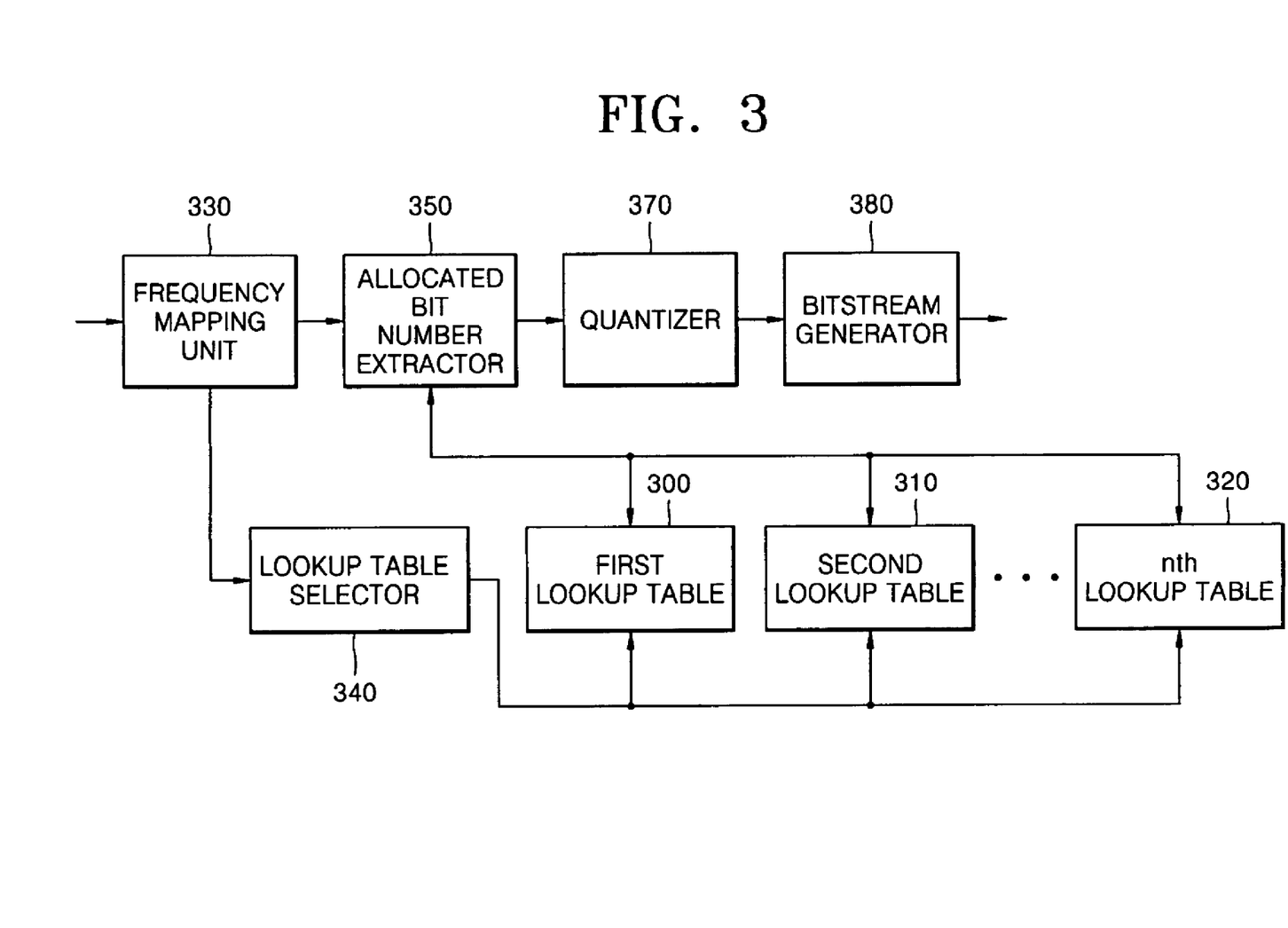
FIG. 3 is a block diagram of a digital signal encoding apparatus using a plurality of lookup tables according to an embodiment of the present invention.

FIG. 3 is a block diagram of a digital signal encoding apparatus using a plurality of lookup tables according to an embodiment of the present invention. Referring to FIG. 3, the apparatus includes a plurality of lookup tables 300, 310 and 320, a frequency mapping unit 330, a lookup table selector 340, an allocated bit number extractor 350, a quantizer 370, and a bitstream generator 380.

The plurality of lookup tables 300, 310 and 320 are generated by the digital signal encoding apparatus according to characteristics of input signals. The plurality of lookup tables 300, 310 and 320 store numbers of allocated bits for encoding frequency bands of the input signals in a predetermined number of addresses. Generating the plurality of the lookup tables 300, 310 and 320 will be described in more detail below with respect to FIGS. 8 and 9.

The characteristic of the input signal can be set to the number of frequency bands among the frequency bands of the input signal, whose occupancy rate is less than or greater than a predetermined standard value. The occupancy rate of each frequency band can be set to a larger value between an occupancy rate of a square of a scale factor of each frequency band and an occupancy rate of a mean power of each frequency band. Also, addresses of the lookup table are set to values indicating characteristics of the frequency bands. That is, each address of the lookup table can be set to a dispersion of each frequency band, a scale factor of each frequency band, a square of a scale factor of each frequency band, a mean value of input signals in each frequency band, a mean power of input signals in each frequency band, a larger value between an occupancy rate of a scale factor of each frequency band and an occupancy rate of a mean value of input signals in each frequency band, or a larger value between an occupancy rate of a square of a scale factor of each frequency band and an occupancy rate of a mean power of input signals in each frequency band. The occupancy rate of a scale factor of each frequency band $SR_{scf}$, the occupancy rate of a mean value of input signals in each frequency band $SR_{mean}$, the occupancy rate of a square of a scale factor of each frequency band $SR_{squared\_scf}$, and the occupancy rate of a mean power of the input signals in each frequency band $SR_{mean\_power}$ can be calculated as shown in Equations 2-5, respectively.

$$SR_{scf}[ch][sb] = \frac{scf[ch][sb]}{\sum_{ch}\sum_{sb} scf[ch][sb]} \quad \text{Equation 2}$$

$$SR_{mean}[ch][sb] = \frac{mean[ch][sb]}{\sum_{ch}\sum_{sb} mean[ch][sb]} \quad \text{Equation 3}$$

-continued $$SR_{squared\_scf}[ch][sb] = \frac{squared\_scf[ch][sb]}{\sum_{ch}\sum_{sb} squared\_scf[ch][sb]} \quad \text{Equation 4}$$

$$SR_{mean\_power}[ch][sb] = \frac{mean\_power[ch][sb]}{\sum_{ch}\sum_{sb} mean\_power[ch][sb]} \quad \text{Equation 5}$$

Here, scf indicates a scale factor, mean indicates a mean value, ch indicates a left channel or a right channel, an occupancy rate of which is calculated in an audio signal, and sb indicates a frequency band having the occupancy rate.

The frequency mapping unit 330 divides an input signal in the time domain into signals in predetermined frequency bands using a band resolution filter.

The lookup table selector 340 selects one of the plurality of lookup tables 300, 310 and 320 according to the characteristic of the input signal. The characteristic of the input signal used when the plurality of lookup tables 300, 310 and 320 are generated can be set to the number of frequency bands among the frequency bands of the input signal whose occupancy rate is less than or greater than a predetermined standard value. The occupancy rate of each frequency band can be set to a larger value between an occupancy rate of a scale factor of each frequency band and an occupancy rate of a mean value of input signals in each frequency band or a larger value between an occupancy rate of a square of a scale factor of each frequency band and an occupancy rate of a mean power of input signals in each frequency band, which are calculated in Equation 2.

The allocated bit number extractor 350 calculates address values of the frequency bands of the input signals, extracts numbers of allocated bits corresponding to the calculated address values from the selected lookup table with respect to the frequency bands, and allocates the numbers of bits to the frequency bands. The addresses of the frequency bands are set when the plurality of lookup tables 300, 310 and 320 are generated. Therefore, the allocated bit number extractor 350 calculates values indicating characteristics of the frequency bands of the input signals as the address values, and each of the address values can be a dispersion of each frequency band, a scale factor of each frequency band, a square of a scale factor of each frequency band, a mean value of input signals in each frequency band, a mean power of input signals in each frequency band, a larger value between an occupancy rate of a scale factor of each frequency band and an occupancy rate of a mean value of input signals in each frequency band, or a larger value between an occupancy rate of a square of a scale factor of each frequency band and an occupancy rate of a mean power of input signals in each frequency band.

The quantizer 370 quantizes the input signals using the numbers of bits allocated to the frequency bands. The bitstream generator 380 generates a bitstream using the quantized input signals.

The apparatus can further include a bit number adjuster (not shown) calculating the number of allocated bits of an entire input signal, which is a sum of the number of bits allocated to each frequency band by the allocated bit number extractor 350, comparing the number of allocated bits of the entire input signal, which is determined by an encoding rate required by the apparatus, and the calculated number of allocated bits, and adjusting the number of bits allocated to each frequency band according to the comparison result.

Figure 4:
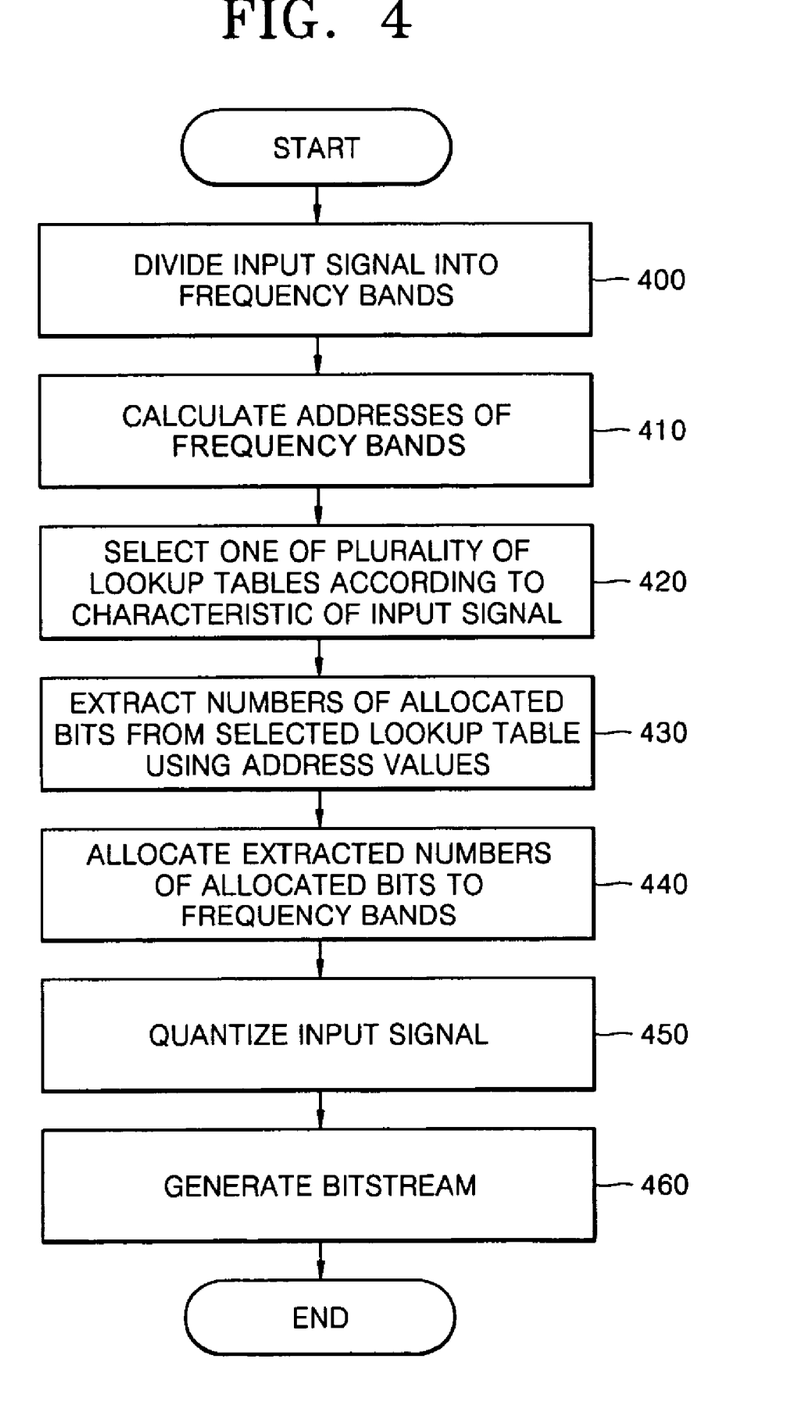
FIG. 4 is a flowchart of a digital signal encoding method using a plurality of lookup tables according to an embodiment of the present invention.

FIG. 4 is a flowchart of a digital signal encoding method using a plurality of lookup tables according to an embodiment of the present invention. Referring to FIGS. 3 and 4, the frequency mapping unit 330 converts an input signal in the time domain into signals in predetermined frequency bands using a band resolution filter in operation 400. The allocated bit number extractor 350 calculates address values of the predetermined frequency bands of the input signals in operation 410. The address values of the predetermined frequency bands indicate characteristics of frequency bands set as addresses when the plurality of lookup tables 300, 310 and 320 are generated, and each of the address values can be a dispersion of each frequency band, a scale factor of each frequency band, a square of a scale factor of each frequency band, a mean value of input signals in each frequency band, a mean power of input signals in each frequency band, a larger value between an occupancy rate of a scale factor of each frequency band and an occupancy rate of a mean value of input signals in each frequency band, or a larger value between an occupancy rate of a square of a scale factor of each frequency band and an occupancy rate of a mean power of input signals in each frequency band. Correlations between characteristics of frequency bands, which can be set as the address values, and the number of allocated bits per frequency band will now be described. A dispersion characteristic shows how near a distribution of an input signal is distributed with respect to an average distribution. If the dispersion is large, a dynamic area of the input signal is large. Accordingly, to reduce quantization noise, more bits must be allocated. If the dispersion is relatively small, even though the bit allocation amount is small, then small amounts of quantization noise are generated. In general, when a mean of an input signal is obtained, the mean value is 0 in a case of a sine wave. Accordingly, a mean power value is used as a characteristic of a frequency band, and more bits are allocated to a frequency band in which a mean power value is large. The scale factor is defined as a largest sample value per frequency band, and more bits are allocated to a frequency band in which a scale factor is large.

The lookup table selector 340 selects one of the plurality of lookup tables 300, 310 and 320 according to the characteristic of the input signal in operation 420. The characteristic of the input signal, which is a standard of lookup table selection, is considered when the plurality of lookup tables 300, 310 and 320 are generated and can be set to the number of frequency bands among the frequency bands of the input signal, whose occupancy rate is less than or more than a predetermined standard value. The occupancy rate of each frequency band can be set to a larger value between an occupancy rate of a scale factor of each frequency band and an occupancy rate of a mean value of input signals in each frequency band or a larger value between an occupancy rate of a square of a scale factor of each frequency band and an occupancy rate of a mean power of input signals in each frequency band, which are calculated in Equations 2-5.

The allocated bit number extractor 350 extracts numbers of allocated bits having the address values of frequency bands calculated in operation 410 from the selected lookup table as addresses in operation 430, and allocates the numbers of bits to the frequency bands in operation 440. The quantizer 370 quantizes the input signals using the numbers of bits allocated to the frequency bands in operation 450. The bitstream generator 380 generates a bitstream using the quantized input signals in operation 460.

To match the number of the entire allocated bits of an input signal encoded by the method described above to the number of bits required by a compression ratio, after operation 440 is performed, the number of entirely required bits of the input signal and the calculated number of allocated bits can be compared and the number of bits allocated to each frequency band can be adjusted according to the comparison result.

Figure 5:
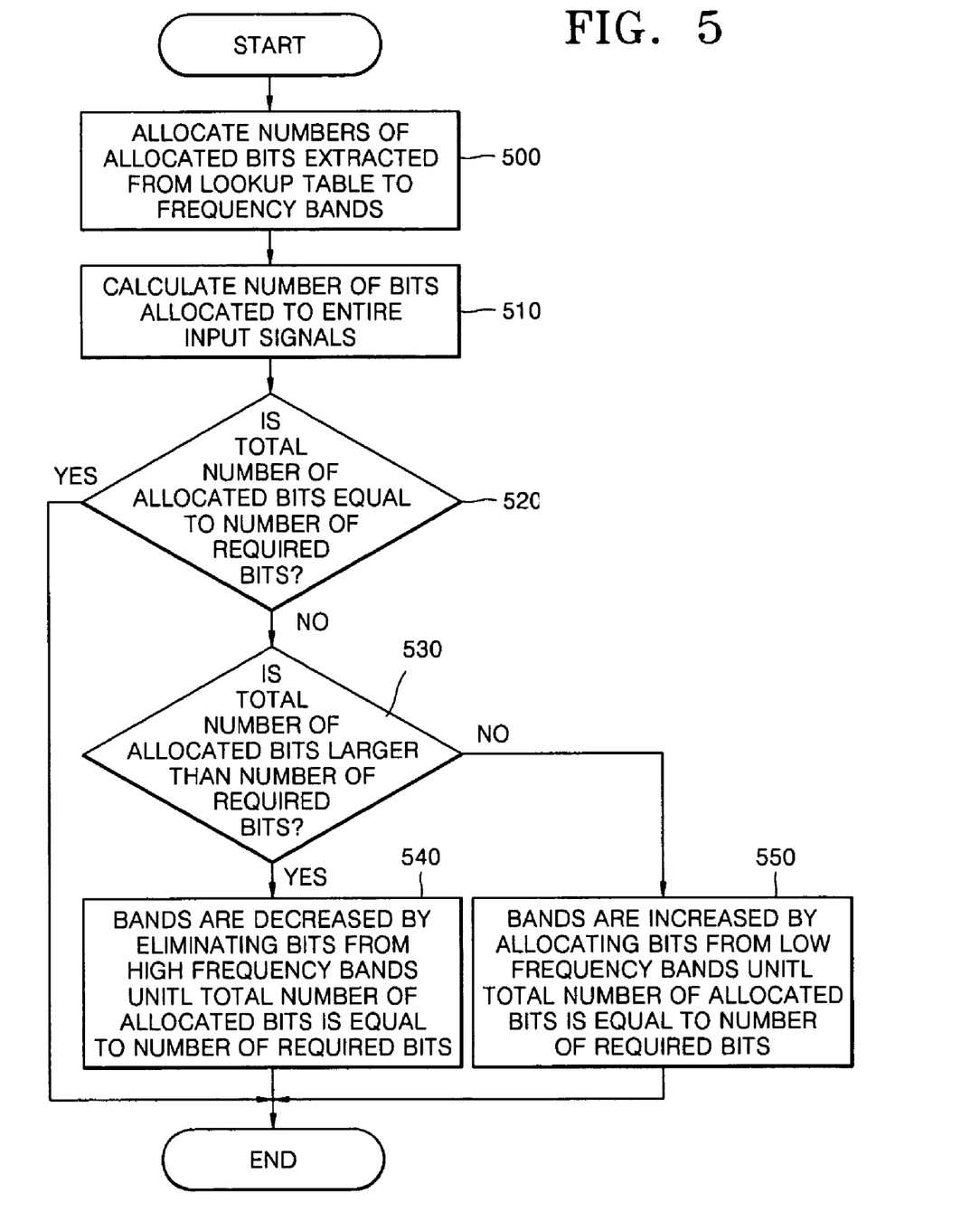
FIG. 5 is a detailed flowchart of a method of allocating the number of allocated bits to each frequency band of FIG. 4.

FIG. 5 is a detailed flowchart of a method of allocating the number of allocated bits to each frequency band of FIG. 4. Referring to FIG. 5, numbers of allocated bits of frequency bands extracted from a lookup table are allocated to the frequency bands in operation 500, and the number of bits actually allocated to an entire input signal is calculated by summing the numbers of allocated bits in operation 510.

It is determined whether the calculated number of bits actually allocated to the entire input signal is equal to the number of required bits determined by a compression ratio required by encoding, for example, the number of entire bits of the input signal is 100 and the number of required bits is 50 when the compression ratio is 50%, in operation 520. If the number of allocated bits is equal to the number of required bits, as many bits as the numbers of bits allocated in operation 500 are allocated to frequency bands.

If the number of allocated bits is not equal to the number of required bits, it is determined whether the number of allocated bits is larger than the number of required bits in operation 530. If the number of allocated bits is larger than the number of required bits, then in operation 540, adjustment is performed from the highest frequency band, and a band whose occupancy rate is lowest and to which more than one bit is allocated is decreased by eliminating one bit until the number of allocated bits is equal to the number of required bits. Here, all bands are evenly decreased by designating a lowest priority to the one bit decreased band. Also, the decrease occurs from a high frequency band because important information is concentrated mainly in low frequencies.

If allocatable extra bits exist since the number of allocated bits is smaller than the number of required bits, in operation 550, adjustment is performed from the lowest frequency band, and a band whose occupancy rate is highest and to which the number of bits less than a maximum value is allocated is increased by allocating one bit until the number of allocated bits is equal to the number of required bits.

Figure 6:
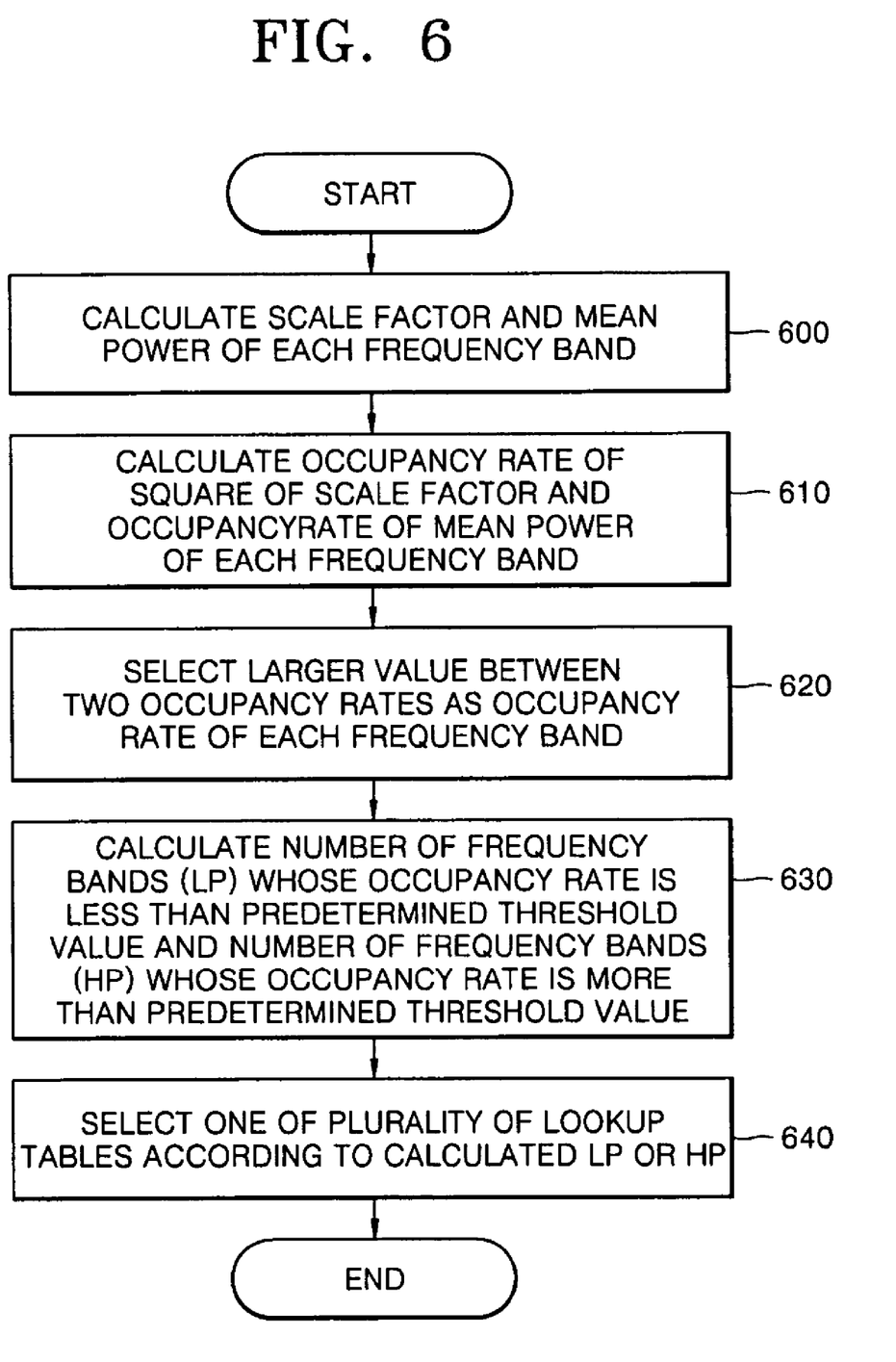
FIG. 6 is a detailed flowchart of a method of selecting one of a plurality of lookup tables of FIG. 4.

FIG. 6 is a detailed flowchart of a method of selecting one of the plurality of lookup tables of FIG. 4. Referring to FIG. 6, a scale factor of each frequency band and a mean power of input signals in each frequency band are calculated in operation 600, and an occupancy rate of a square of a scale factor of each frequency band and an occupancy rate of a mean power of input signals in each frequency band are calculated as shown in Equations 2-5 in operation 610.

A larger value between the occupancy rates calculated in operation 610 is selected as an occupancy rate of each frequency band in operation 620. The number of frequency bands (LP) of which the selected occupancy rate is lower than a predetermined occupancy rate and the number of frequency bands (HP) of which the selected occupancy rate is higher than the predetermined occupancy rate are calculated in operation 630.

One of a plurality of lookup tables is selected according to the numbers of frequency bands (LP and HP) calculated in operation 630, which are representing a characteristic of an input signal, in operation 640. If the number of frequency bands (LP) of which an occupancy rate is lower than the predetermined occupancy rate is large, input signals are concentratedly distributed in a specific frequency band. Accordingly, a lookup table in which more bits are allocated to frequency bands where input signals are distributed is selected. Also, if the number of frequency bands (HP) of which the selected occupancy rate is higher than the predetermined occupancy rate is small, input signals are concentratedly distributed in a specific frequency band. Accordingly, a lookup table in which more bits are allocated to frequency bands where input signals are distributed is selected.

Figure 7A:
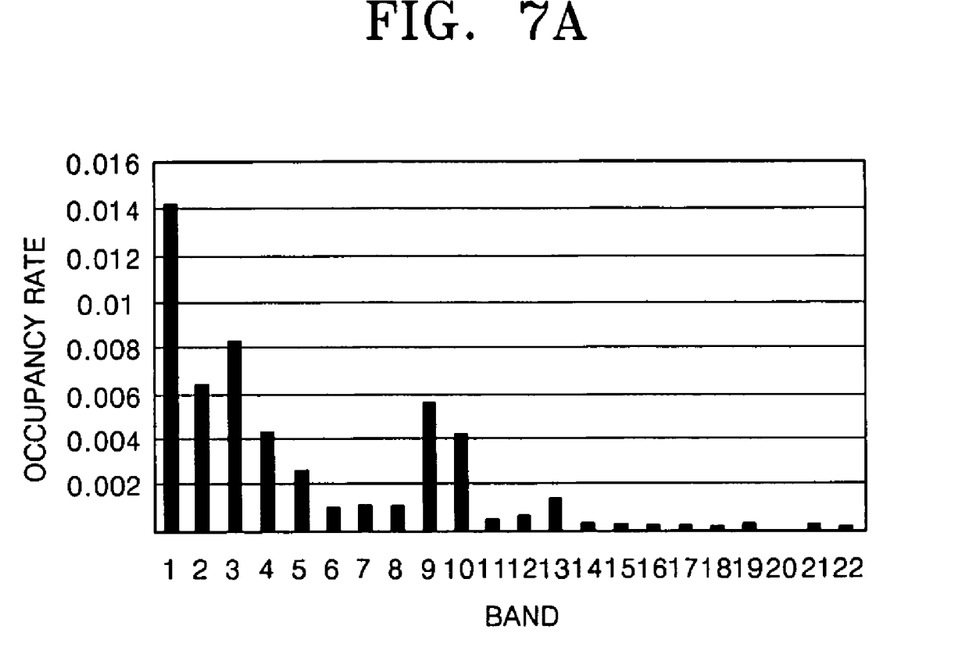
FIG. 7A is a graph showing occupancy rates of frequency bands of input signals having a general characteristic.
Figure 7B:
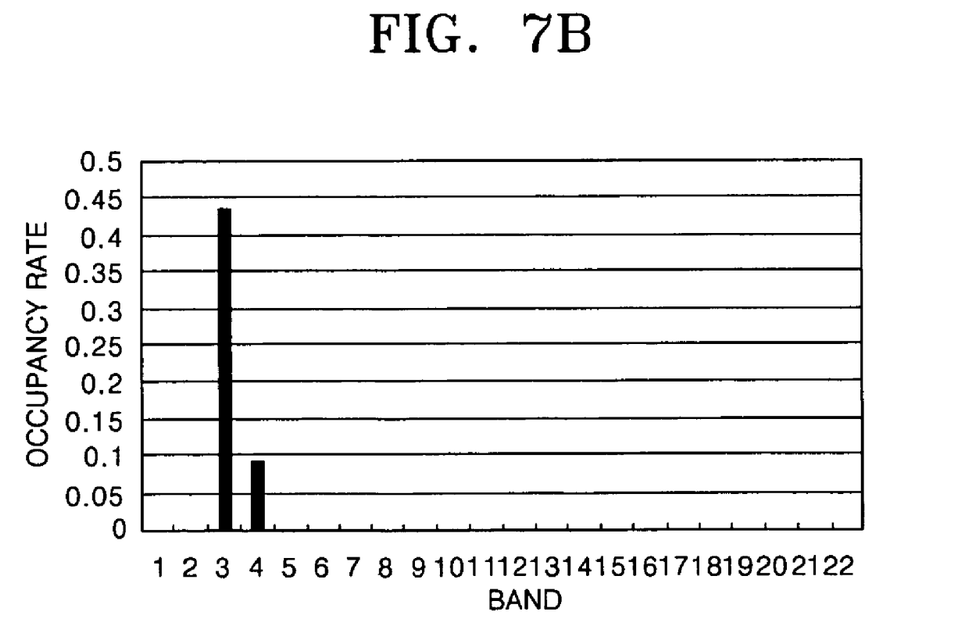
FIG. 7B is a graph showing occupancy rates of frequency bands of input signals having a characteristic concentrated in a specific frequency band.

FIGS. 7A and 7B are graphs showing occupancy rates of frequency bands of input signals. FIG. 7A shows input signals having a general characteristic. Referring to FIG. 7A, since LP is small and HP is large, a lookup table in which allocated bits are evenly distributed in every frequency band is selected.

FIG. 7B shows input signals having a characteristic concentrated in a specific frequency band. Referring to FIG. 7B, since LP is large and HP is small, a lookup table in which many allocated bits are stored in a specific frequency band is selected.

Figure 8:
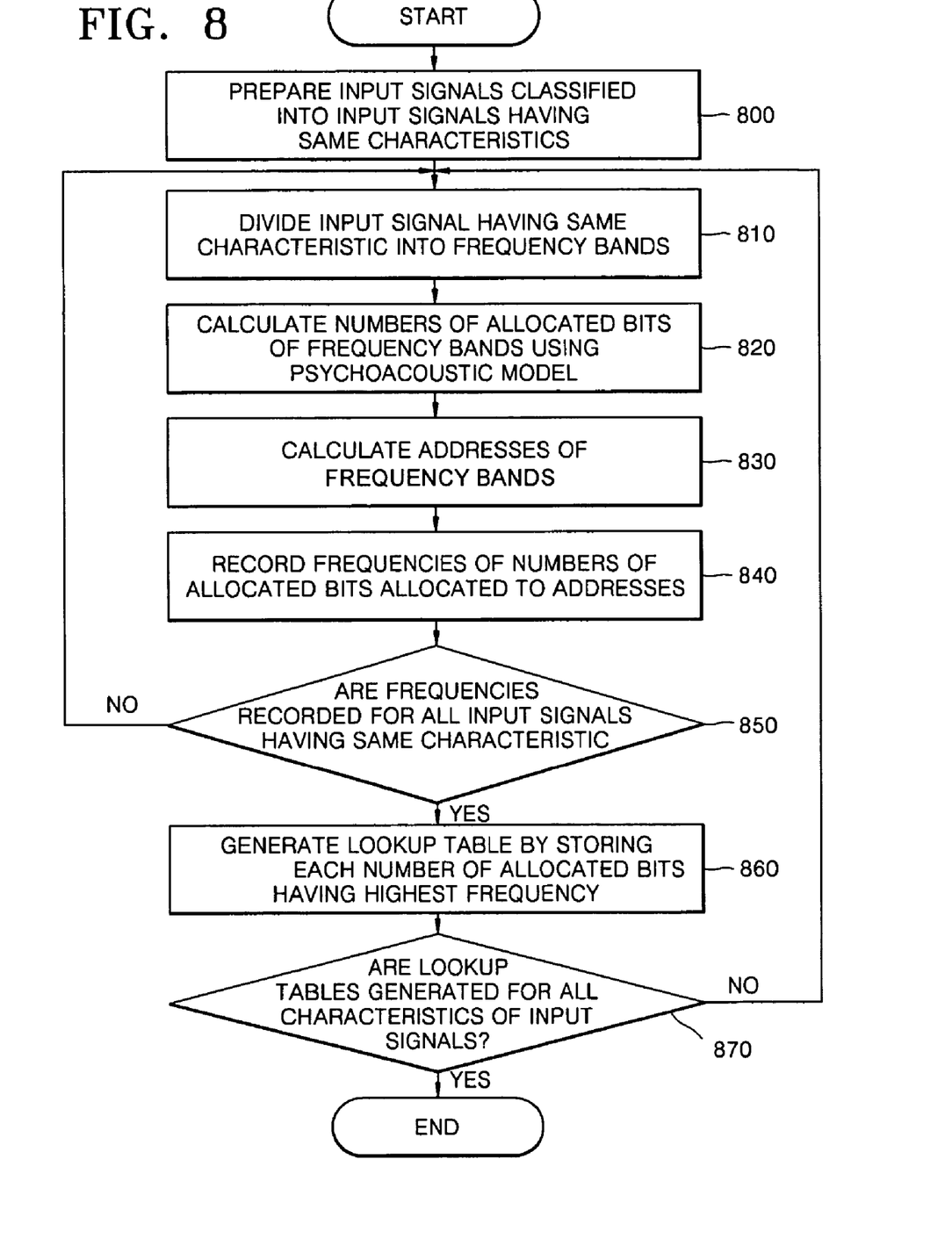
FIG. 8 is a flowchart of a method generating a plurality of lookup tables according to a first embodiment of the present invention.

FIG. 8 is a flowchart of a method of generating a plurality of lookup tables according to a first embodiment of the present invention. Referring to FIG. 8, a predetermined number of input signals having various signal characteristics and classified into signals having the same signal characteristics are prepared in operation 800. The characteristic of the input signal can be the number of frequency bands among the frequency bands of the input signal whose occupancy rate is less than or greater than a predetermined standard value. The occupancy rate of each frequency band can be set to a larger value between an occupancy rate of a scale factor of each frequency band and an occupancy rate of a mean value of the input signals in each frequency band or a larger value between an occupancy rate of a square of a scale factor of each frequency band and an occupancy rate of a mean power of the input signals in each frequency band, which are calculated in Equations 2-5.

One characteristic of the characteristics of the input signals is selected, and one of the input signals having the selected characteristic is divided into frequency bands in operation 810. With respect to the input signal having the selected characteristic, the number of allocated bits of each frequency band is calculated using a psychoacoustic model in operation 820. Since a method of calculating the number of allocated bits is the same as an operation of the psychoacoustic model 110 shown in FIG. 1, description of the method is omitted.

Address values of frequency bands of the input signal are calculated in operation 830. The address values can be set to values indicating characteristics of the frequency bands of the input signal, and each value can be calculated by being set to a dispersion of each frequency band, a scale factor of each frequency band, a square of a scale factor of each frequency band, a mean value of input signals in each frequency band, a mean power of input signals in each frequency band, a larger value between an occupancy rate of a scale factor of each frequency band and an occupancy rate of a mean value of input signals in each frequency band, or a larger value between an occupancy rate of a square of a scale factor of each frequency band and an occupancy rate of a mean power of input signals in each frequency band.

The numbers of allocated bits calculated in operation 820 are stored in respective addresses having the address values of frequency bands calculated in operation 830, and frequencies that the numbers of allocated bits are stored in the respective addresses are recorded in operation 840.

Until operations 810 through 840 are performed for all input signals having the selected characteristic, operations 810 through 840 are repeated in operation 850.

After operations 810 through 840 are performed for all input signals having the selected characteristic, a lookup table is generated by storing each value having a largest frequency among the numbers of allocated bits stored in each address of each frequency band as the number of allocated bits in operation 860. The size of the lookup table can be reduced by excluding addresses of which the number of allocated bits is 0 from the generated lookup table or storing only addresses, in which the number of allocated bits is changed, in the generated lookup table when the numbers of allocated bits of consecutive addresses are the same.

In operation 870 it is confirmed whether lookup tables are generated for all characteristics of the input signals prepared in operation 800, and operations 810 through 860 are repeated until all lookup tables are generated. It is understood that the digital signal encoding system may generate the plurality of lookup tables or that a separate system such as a personal computer may be programmed to perform the method of FIG. 8 to generate the plurality of lookup tables which may then be stored in a memory.

Figure 9:
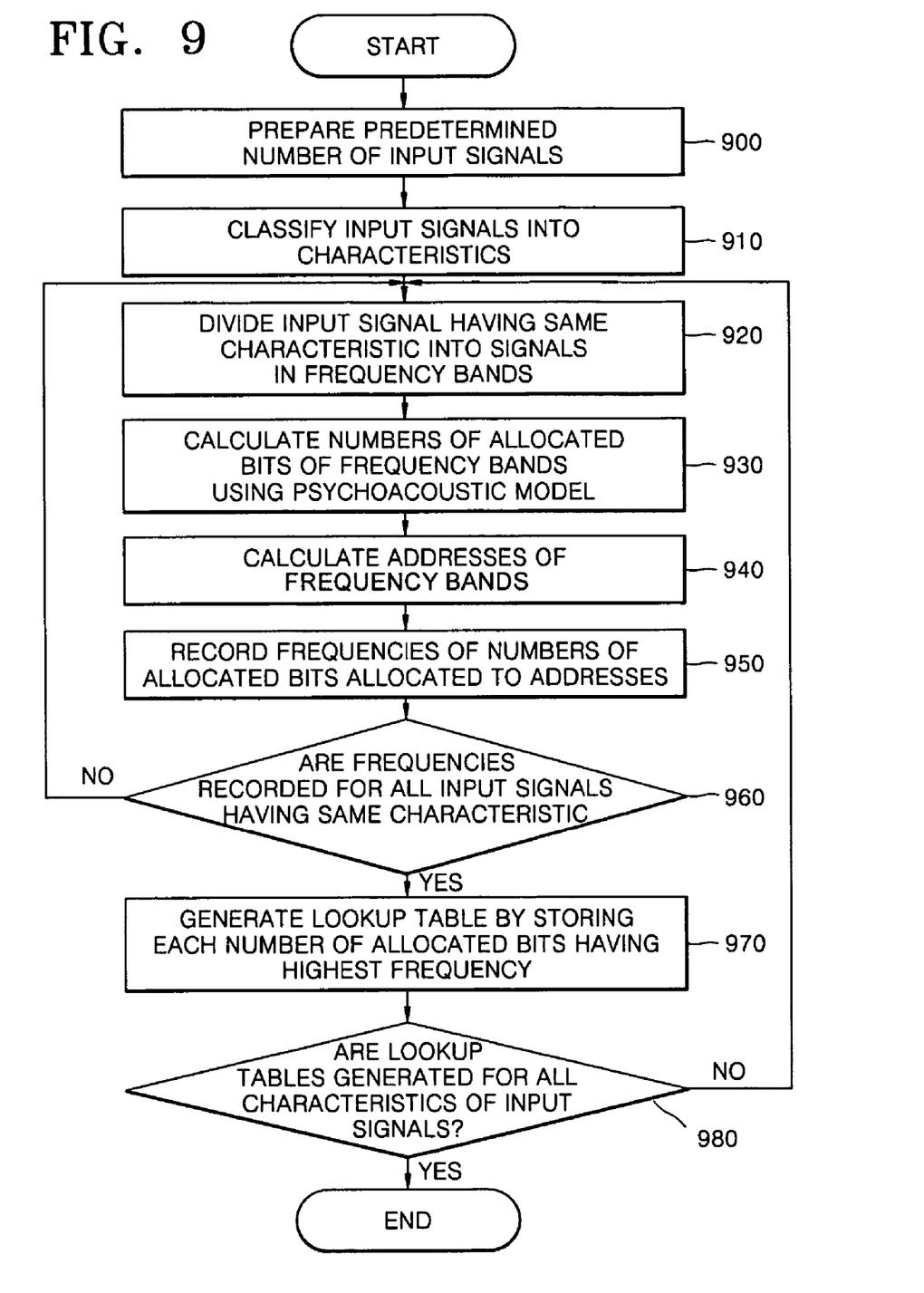
FIG. 9 is a flowchart of a method generating a plurality of lookup tables according to a second embodiment of the present invention.

FIG. 9 is a flowchart of a method generating a plurality of lookup tables according to a second embodiment of the present invention. Referring to FIG. 9, a predetermined number of input signals having various characteristics are prepared in operation 900. The input signals are classified according to a predetermined number of characteristics in operation 910. The characteristic of the input signal can be the number of frequency bands, whose occupancy rate is less than or greater than a predetermined standard value, among the frequency bands of the input signal. The occupancy rate of each frequency band can be set to a larger value between an occupancy rate of a scale factor of each frequency band and an occupancy rate of a mean value of input signals in each frequency band or a larger value between an occupancy rate of a square of a scale factor of each frequency band and an occupancy rate of a mean power of input signals in each frequency band, which are calculated in Equations 2-5.

One characteristic of the classified characteristics of the input signals is selected, and one of the input signals having the selected characteristic is divided into frequency bands in operation 920. With respect to the input signal, the number of allocated bits to each frequency band is calculated using a psychoacoustic model in operation 930. Since a method of calculating the number of allocated bits is the same as an operation of the psychoacoustic model 110 shown in FIG. 1, the description of the method is omitted.

Address values of frequency bands of the input signal are calculated in operation 940. The address values can be set to values indicating characteristics of the frequency bands of the input signal, and each value can be calculated by being set to a dispersion of each frequency band, a scale factor of each frequency band, a square of a scale factor of each frequency band, a mean value of input signals in each frequency band, a mean power of input signals in each frequency band, a larger value between an occupancy rate of a scale factor of each frequency band and an occupancy rate of a mean value of input signals in each frequency band, or a larger value between an occupancy rate of a square of a scale factor of each frequency band and an occupancy rate of a mean power of input signals in each frequency band.

The numbers of allocated bits calculated in operation 930 are stored in respective addresses having the address values of frequency bands calculated in operation 940, and frequencies that the numbers of allocated bits are stored in the respective addresses are recorded in operation 950.

Operations 920 through 950 are repeated in operation 960 until operations 920 through 950 are performed for all input signals having the selected characteristic.

After operations 920 through 950 are performed for all input signals having the selected characteristic, a lookup table is generated by storing each value having a largest frequency among the numbers of allocated bits stored in each address of each frequency band as the number of allocated bits in operation 970. The size of the lookup table can be reduced by excluding addresses of which the number of allocated bits is 0 from the generated lookup table or storing only addresses, in which the number of allocated bits is changed, in the generated lookup table when the numbers of allocated bits of consecutive addresses are the same.

In operation 980 it is confirmed whether lookup tables are generated for all characteristics of the input signals prepared in operation 900, and until all lookup tables are generated, operations 920 through 970 are repeated.

Figure 10:
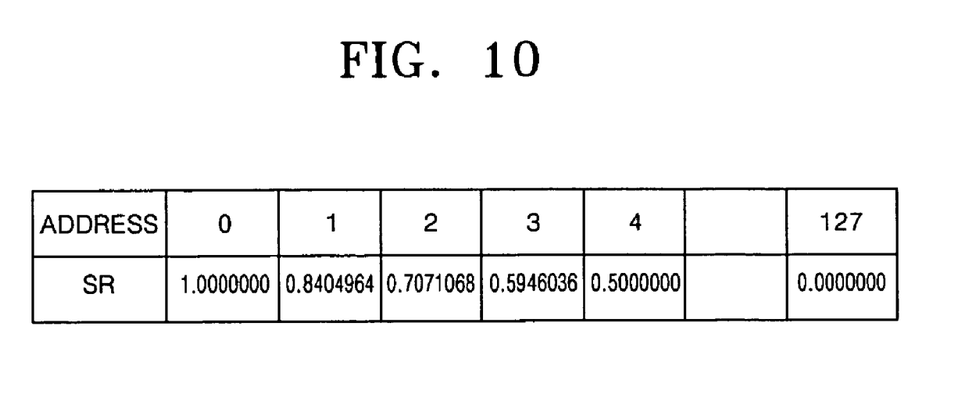
FIG. 10 is an example of a method of setting addresses of a lookup table.

FIG. 10 is an example of a method of setting addresses of a lookup table. The setting method shown in FIG. 10 uses a larger value between an occupancy rate of a square of a scale factor of each frequency band and an occupancy rate of a mean power of each frequency band as each address of the lookup table. All occupancy rates, which are respective addresses of the lookup table, have values between 0 and 1, and the occupancy rates between 0 and 1 are set to 127 addresses.

Figure 11:
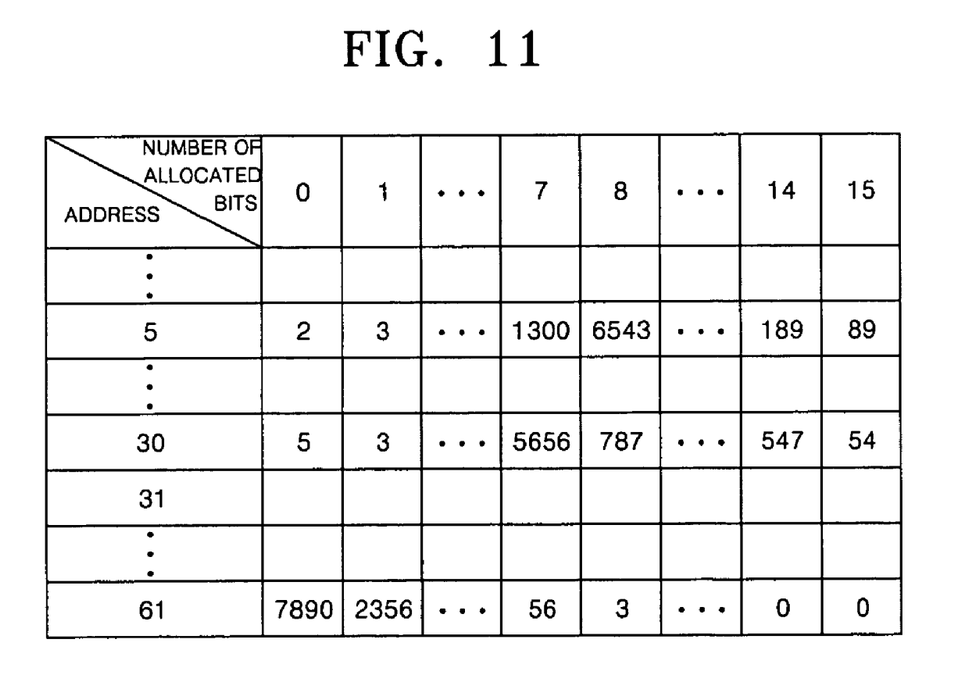
FIG. 11 is a table illustrating an example of a method of generating a lookup table.

FIG. 11 is a table illustrating an example of a method of generating a lookup table. The generating method shown in FIG. 11 is a method of generating a lookup table using frequencies of the numbers of allocated bits in operation 860 of FIG. 8 or in operation 970 of FIG. 9. Referring to FIG. 11, the number of allocated bits per address for one frequency band is stored in a lookup table. In the lookup table, 8 having a highest frequency is stored as the final number of allocated bits in a case of an address 5, 7 having a highest frequency is stored as the final number of allocated bits in a case of an address 30, and 0 having a highest frequency is stored as the final number of allocated bits in a case of an address 61. To reduce the size of the lookup table, addresses of which the number of allocated bits is 0 can be excluded from the lookup table, or when the numbers of allocated bits of consecutive addresses are the same, only addresses in which the number of allocated bits is changed can be stored in the lookup table.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet).

As described above, according to a digital signal encoding method and apparatus using a plurality of lookup tables according to embodiments of the present invention, bit amount control suitable for a characteristic of an input signal can be performed by extracting numbers of allocated bits of frequency bands from an optimal lookup table selected according to the characteristic of the input signal. Also, an additional computational amount can be reduced by using each occupancy rate per frequency band equal to each address of the lookup table as the characteristic of the input signal.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A digital signal encoding method, comprising:
   preparing a plurality of lookup tables storing numbers of allocated bits used to encode frequency bands of an input signal in a predetermined number of addresses;
   dividing the input signal in a time domain into signals in predetermined frequency bands;

calculating address values of the predetermined frequency bands;

selecting one of the plurality of lookup tables according to a characteristic of the input signal, the selected lookup table being used for all of the predetermined frequency bands of the input signal, the characteristic of the input signal being the number of frequency bands among the frequency bands of the input signal, whose occupancy rate is less than or more than a predetermined standard value;

extracting the numbers of allocated bits of addresses having the calculated address values from the selected lookup table with respect to the predetermined frequency bands;

allocating the extracted numbers of bits to the predetermined frequency bands; and generating a bitstream by quantizing the input signal according to the numbers of allocated bits.

2. The method of claim 1, wherein the occupancy rate of each predetermined frequency band is a larger value between an occupancy rate of a scale factor of each predetermined frequency band and an occupancy rate of a mean value of the signals in each predetermined frequency band.

3. The method of claim 1, wherein the occupancy rate of each predetermined frequency band is a larger value between an occupancy rate of a scale factor of each predetermined frequency band and an occupancy rate of a mean value of the signals in each predetermined frequency band.

4. The method of claim 1, wherein the occupancy rate of each predetermined frequency band is a larger value between an occupancy rate of a square of a scale factor of each predetermined frequency band and an occupancy rate of a mean power of the signals in each predetermined frequency band.

5. The method of claim 1, wherein the occupancy rate of each predetermined frequency band is a larger value between an occupancy rate of a square of a scale factor of each predetermined frequency band and an occupancy rate of a mean power of the signals in each predetermined frequency band.

6. The method of claim 1, wherein the address of the selected lookup table is calculated by a dispersion of the signals in a corresponding one of the predetermined frequency bands.

7. The method of claim 1, wherein the address of the selected lookup table is calculated by a scale factor of the signals in a corresponding one of the predetermined frequency bands.

8. The method of claim 1, wherein the address of the selected lookup table is calculated by a square of a scale factor of the signals in a corresponding one of the predetermined frequency bands.

9. The method of claim 1, wherein the address of the selected lookup table is calculated by a mean value of the signals in a corresponding one of the predetermined frequency bands.

10. The method of claim 1, wherein the address of the selected lookup table is calculated by a mean power of the signals in a corresponding one of the predetermined frequency bands.

11. The method of claim 1, wherein the address of the selected lookup table is a larger value between an occupancy rate of a scale factor of the predetermined frequency band and an occupancy rate of a mean value of the signals in a corresponding one of the predetermined frequency bands.

12. The method of claim 1, wherein the address of the selected lookup table is a larger value between an occupancy rate of a square of a scale factor of one of the frequency bands and an occupancy rate of a mean power of the signals in the one of the frequency bands.

13. The method of claim 1, further comprising:

comparing the number of bits actually allocated to the input signal and the number of bits required for the input signal and adjusting the number of allocated bits according to the comparison result.

14. A digital signal encoding apparatus, comprising:

a plurality of lookup tables storing numbers of allocated bits used to encode frequency bands of an input signal in a predetermined number of addresses;

a frequency mapping unit dividing the input signal in a time domain into signals in predetermined frequency bands;

a lookup table selector selecting one of the plurality of lookup tables according to a characteristic of the input signal, the selected lookup table being used for all of the predetermined frequency bands of the input signal, the characteristic of the input signal being the number of frequency bands among the frequency bands of the input signal, whose occupancy rate is less than or more than a predetermined standard value;

an allocated bit number extractor calculating address values of the predetermined frequency bands of the input signal, extracting the numbers of allocated bits corresponding to the calculated address values from the selected lookup table with respect to the predetermined frequency bands, and allocating the numbers of bits to the predetermined frequency bands;

a quantizer quantizing the input signal using the numbers of bits allocated to the predetermined frequency bands; and a bitstream generator generating and outputting a bitstream using the quantized input signal.

15. The apparatus of claim 14, wherein the occupancy rate of each predetermined frequency band is a larger value between an occupancy rate of a scale factor of each predetermined frequency band and an occupancy rate of a mean value of the signals in each predetermined frequency band.

16. The apparatus of claim 14, wherein the occupancy rate of each predetermined frequency band is a larger value between an occupancy rate of a scale factor of each predetermined frequency band and an occupancy rate of a mean value of the signals in each predetermined frequency band.

17. The apparatus of claim 14, wherein the occupancy rate of each predetermined frequency band is a larger value between an occupancy rate of a square of a scale factor of each predetermined frequency band and an occupancy rate of a mean power of the signals in each predetermined frequency band.

18. The apparatus of claim 14, wherein the occupancy rate of each predetermined frequency band is a larger value between an occupancy rate of a square of a scale factor of each predetermined frequency band and an occupancy rate of a mean power of the signals in each predetermined frequency band.

19. The apparatus of claim 14, wherein the address of the selected lookup table is calculated by a dispersion of the signals in a corresponding one of the predetermined frequency bands.

20. The apparatus of claim 14, wherein the address of the selected lookup table is calculated by a scale factor of the signals in a corresponding one of the predetermined frequency bands.

21. The apparatus of claim 14, wherein the address of the selected lookup table is calculated by a square of a scale factor of the signals in a corresponding one of the predetermined frequency bands.

22. The apparatus of claim 14, wherein the address of the selected lookup table is calculated by a mean value of the signals in a corresponding one of the predetermined frequency bands.

23. The apparatus of claim 14, wherein the address of the selected lookup table is calculated by a mean power of the signals in a corresponding one of the predetermined frequency bands.

24. The apparatus of claim 14, wherein the address of the selected lookup table is a larger value between an occupancy rate of a scale factor of the frequency band and an occupancy rate of a mean value of signals in a corresponding one of the predetermined frequency bands.

25. The apparatus of claim 14, wherein the address of the selected lookup table is a larger value between an occupancy rate of a square of a scale factor of the frequency band and an occupancy rate of a mean power of signals in a corresponding one of the predetermined frequency bands.

26. The apparatus of claim 14, further comprising:
a bit number adjuster comparing the number of bits allocated to the input signal by the allocated bit number extractor and the number of bits required for the input signal and adjusting the number of bits allocated to each frequency band according to the comparison result.

27. A computer readable medium having recorded thereon a computer readable program for performing the method of claim 1.

28. A digital input signal encoding method, comprising:
generating a plurality of lookup tables storing numbers of allocated bits used to encode a first set of frequency bands of a plurality of input signals in a number of addresses;
extracting numbers of the allocated bits of frequency bands from an optimal one of the plurality of lookup tables selected according to a characteristic of the digital input signal, the selected lookup table being used for all of the predetermined frequency bands of the input signal, the characteristic of the digital input signal being the number of frequency bands among the frequency bands of the input signal, whose occupancy rate is less than or more than a predetermined standard value; and
generating an output bitstream by quantizing the one input signal according to the numbers of allocated bits.

29. A digital signal encoding method, comprising:
generating a plurality of lookup tables storing numbers of allocated bits used to encode a first set of frequency bands of a plurality of input signals in a number of addresses;
receiving one input signal of the plurality of input signals;
dividing the one input signal in a time domain into frequency domain signals in a second set of frequency bands;
calculating address values of the second set of frequency bands;
selecting one of the plurality of lookup tables according to a characteristic of the one input signal, the selected lookup table being used for all of the predetermined frequency bands of the input signal, the characteristic of the input signal being the number of frequency bands among the frequency bands of the input signal, whose occupancy rate is less than or more than a predetermined standard value;
extracting the numbers of the allocated bits of addresses having the calculated address values from the selected lookup table with respect to the second set of frequency bands; and
generating an output bitstream by quantizing the one input signal according to the numbers of allocated bits.

30. The digital signal encoding method of claim 29, wherein the first set of frequency bands overlaps the second set of frequency bands.

31. The digital signal encoding method of claim 29, wherein the characteristic of the one input signal is a number of frequency bands among the second set of frequency bands of the one input signal having an occupancy rate which is less than or greater than a threshold value.

32. The digital signal encoding method of claim 29, wherein the generating the plurality of lookup tables storing numbers of allocated bits used to encode a first set of frequency bands of a plurality of input signals in a number of addresses comprises storing each value having a largest frequency among the numbers of the allocated bits stored in each number of allocated bits having a highest frequency among the first set of frequency bands.

33. The digital signal encoding method of claim 32, wherein a size of each lookup table is reduced by excluding the addresses having no allocated bits.

34. The digital signal encoding method of claim 32, wherein a size of each lookup table is reduced by storing only the addresses having a number of allocated bits which are altered.

35. A digital signal encoding apparatus, comprising:
a frequency mapper receiving and dividing one input signal in a time domain into frequency domain signals in a first set of frequency bands;
a plurality of lookup tables storing numbers of allocated bits used to encode a second set of frequency bands of a plurality of input signals including the one input signal in a number of addresses;
a selector selecting one of the plurality of lookup tables according to a characteristic of the one input signal, the selected lookup table being used for all of the predetermined frequency bands of the input signal, the characteristic of the input signal being the number of frequency bands among the frequency bands of the input signal, whose occupancy rate is less than or more than a predetermined standard value;
an allocated bit number extractor calculating address values of the first set of frequency bands of the one input signal, extracting the numbers of allocated bits corresponding to the calculated address values from the selected one lookup table with respect to the first set of frequency bands, and allocating the extracted numbers of allocated bits to the first set of frequency bands;
a quantizer quantizing the one input signal using the extracted numbers of bits allocated to the first set of frequency bands; and
a bitstream generator generating a bitstream representation of the one input signal according to the quantized input signal.

36. The digital signal encoding apparatus of claim 35, wherein the first set of frequency bands is within a range of the second set of frequency bands.

37. The digital signal encoding apparatus of claim 35, wherein the characteristic of the one input signal is a number of frequency bands among the second set of frequency bands of the one input signal having an occupancy rate which is less than or greater than a threshold value.

38. A computer readable medium having recorded thereon a computer readable program for performing the method of claim 28.

* * * * *